US012799916B2

(12) United States Patent
Havens et al.

(10) Patent No.: US 12,799,916 B2
(45) Date of Patent: Nov. 17, 2026

(54) NATURAL GAS ENGINE START AND LOAD SYSTEM

(71) Applicant: Flanders Electric Motor Service, LLC, Evansville, IN (US)

(72) Inventors: Brian Curtis Havens, Columbia, SC (US); Benjamin Alex Balbach, Evansville, IN (US); Miles Christopher Griggs, Evansville, IN (US); Jerome Thomas Gohre, Evansville, IN (US)

(73) Assignee: Flanders Electric Motor Service, LLC, Evansville, IN (US)

( * ) Notice: Subject to any disclaimer, the term of this patent is extended or adjusted under 35 U.S.C. 154(b) by 89 days.

(21) Appl. No.: 18/655,104

(22) Filed: May 3, 2024

(65) Prior Publication Data

US 2024/0369034 A1 Nov. 7, 2024

Related U.S. Application Data

(60) Provisional application No. 63/500,219, filed on May 4, 2023.

(51) Int. Cl.

| | |
|---|---|
| ***F02N 11/08*** | (2006.01) |
| ***E21B 43/12*** | (2006.01) |
| ***F01P 3/20*** | (2006.01) |
| ***F02B 63/06*** | (2006.01) |
| ***F02N 11/04*** | (2006.01) |
| ***H02P 23/00*** | (2016.01) |

(52) U.S. Cl.
CPC ........ *F02N 11/0862* (2013.01); *E21B 43/126* (2013.01); *F01P 3/20* (2013.01); *F02B 63/06* (2013.01); *F02N 11/04* (2013.01); *H02P 23/0004* (2013.01); *F02N 2011/0888* (2013.01)

(58) Field of Classification Search
CPC ................. F02N 11/0862; F02N 11/04; F02N 2011/0888; E21B 43/126; E21B 43/2607; F01P 3/20; F02B 63/06; H02P 23/0004; H02P 2101/25; H02P 3/22; H02P 9/008; H02P 29/40; F02D 29/04
See application file for complete search history.

(56) References Cited

U.S. PATENT DOCUMENTS 8,118,627 B2 * 2/2012 Wejrzanowski ........... B63J 3/02 322/58
11,349,331 B2 * 5/2022 Stoltz .................... H02J 7/1492
(Continued)

*Primary Examiner* — Kurt Philip Liethen
(74) *Attorney, Agent, or Firm* — Lathrop GPM LLP

(57) ABSTRACT

A system including an engine connectable to a time variant working load. A motor is connected to the engine, and a variable frequency drive is connected to the motor. A system controller is connected to the variable frequency drive, and is programmed to command the variable frequency drive to change a selected mode of the motor according to an operational state of the engine. An electrical generation mode includes the motor operating as a generation load on the engine when the working load falls to an intermediate load below the operational load. A generation load combined with the intermediate load includes about the operational load. A standby mode includes the motor operating as a standby load on the engine when the working load about equals the operational load. A drive mode includes the motor applying mechanical power to the engine.

20 Claims, 6 Drawing Sheets

(56) References Cited

U.S. PATENT DOCUMENTS

| | | | | |
|---|---|---|---|---|
| 12,424,378 | B2 * | 9/2025 | MacLennan | H01F 1/26 |
| 2013/0019849 | A1 * | 1/2013 | Zillmer | F24B 1/02<br>126/80 |
| 2016/0075345 | A1 * | 3/2016 | Sonnleitner | B60L 3/00<br>701/19 |
| 2016/0097405 | A1 * | 4/2016 | Hoshino | E02F 9/2296<br>60/428 |
| 2016/0376976 | A1 * | 12/2016 | McAndrew | F02B 63/044<br>123/41.57 |
| 2018/0251041 | A1 * | 9/2018 | Liu | F02N 15/08 |
| 2019/0135128 | A1 * | 5/2019 | Kim | B60K 1/04 |
| 2019/0176647 | A1 * | 6/2019 | Liu | B60L 15/007 |
| 2019/0178235 | A1 * | 6/2019 | Coskrey | E21B 41/0085 |
| 2021/0075222 | A1 * | 3/2021 | Wilson | F01P 3/20 |
| 2021/0245854 | A1 * | 8/2021 | Økland | B63H 21/17 |

* cited by examiner

NATURAL GAS ENGINE START AND LOAD SYSTEM

CROSS-REFERENCE TO RELATED APPLICATIONS

This application claims priority to U.S. Provisional Patent Application 63/500,219 filed May 4, 2023, the entirety of which is hereby incorporated by reference.

BACKGROUND

Natural gas engines require a certain level of load to function properly, but may have poor dynamic response to this load. Thus, after starting the natural gas engine, a separate load may be controllably ramped up to a certain level, then ramped down as the working load is added to the engine. An electric machine (motor) may be used to manage these loads on the natural gas engine. However, changing working load conditions and operating parameters (temperature, load condition, etc.) makes controlling the electric machine difficult.

SUMMARY

One or more embodiments provide for a system. The system includes an engine connectable to a working load. The working load varies over time between a first load and an operational load greater than the first load. The system also includes a motor connected to the engine. The system also includes a variable frequency drive connected to the motor. The system also includes a system controller connected to the variable frequency drive. The system controller is programmed to command the variable frequency drive to change a selected mode of the motor according to an operational state of the engine. The selected mode includes one of an electrical generation mode, a standby mode, and a drive mode. The electrical generation mode includes the motor operating as a generation load on the engine when the working load falls to an intermediate load below the operational load. The generation load combined with the intermediate load includes about the operational load. The standby mode includes the motor operating as a standby load on the engine when the working load about equals the operational load. The drive mode includes the motor applying mechanical power to the engine.

One or more embodiments also provide for a method. The method includes applying a working load to an engine. The working load varies over time between a first load and an operational load greater than the first load. The engine is connected to a motor. The motor is connected to a variable frequency drive. A system controller is connected to the variable frequency drive. The method also includes changing, by the variable frequency drive according to a first command from the system controller and responsive to the working load falling to an intermediate load below the operational load, a total load applied to the motor by the engine to a generation load. The generation load combined with the intermediate load includes about the operational load. The method also includes changing, by the variable frequency drive according to a second command from the system controller and responsive to the working load being about equal to the operational load, the total load applied by the motor to the engine to a standby load.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

Figure 1A:
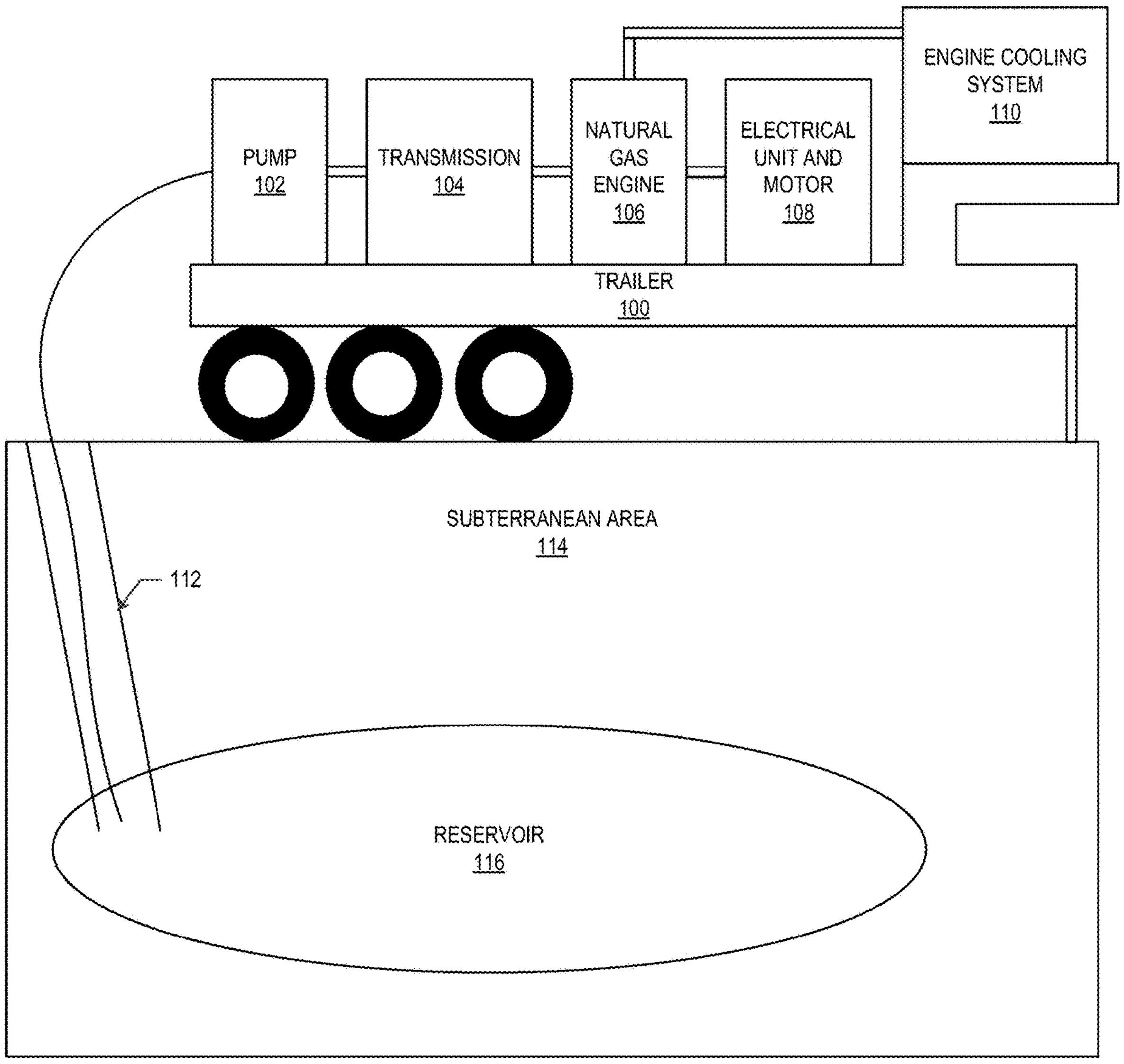
FIG. 1A shows a system using a natural gas engine, in accordance with one or more embodiments.

One or more embodiments are directed to a natural gas engine start and load system. Natural gas engines may be designed to operate under a predetermined load to function properly, but may exhibit a poor response to the predetermined load. Furthermore, the natural gas engine may be subject to undue stress if no load is applied to the natural gas engine.

Thus, after starting, the engine should be separately loaded even if the working load is not ready to be applied to the engine. Accordingly, after engine start, at least some minimal separate load is applied to the engine until the working load is ready to be applied to the engine. The working load may be, for example, a pump at a natural resource exploration and production site. Once the system that constitutes the working load is ready, the separate load is ramped down as the working load is added.

One or more embodiments provide for an electric motor connected to an engine (e.g., via a shaft of the engine) and a drive system. The drive system is used to control the motor. The motor operates as a generator to provide a separate load to the natural gas engine according to a time-varying loading scheme. The separate load from the motor may be ramped using a drive system as the engine is started. The separate load may be ramped down as a working load is added. The separate load can then be added again as the working load is removed and the engine is stopped. Thus, the motor may continuously moderate the overall load on the engine, thereby reducing the stress on the motor.

When acting as a separate load, the motor generates electricity. The electricity may be supplied to a battery and stored as a battery charge for later use. Electricity generated in excess of a desired battery charge may be supplied to a load resistor. The load resistor dissipates the excess electricity in the form of heat. Thus, the load resistor may be cooled by a fan or some other cooling mechanism.

Other electrical components also may be provided. For example, a direct current to direct current voltage converter (a DC/DC converter) may moderate the voltage level between the motor and the battery. An alternating current to direct current inverter (an AC/DC inverter) may convert a direct current drawn from the battery to an alternating current usable by one or more components of the electrical system of one or more embodiments, or provided to other electrical systems.

The presence of the motor also makes possible removal of a starter motor ordinarily used to supply a direct current to start the engine. Charge from the battery may cause the motor to drive the engine, thereby starting the engine. In other words, the motor may operate in multiple modes. In a generator mode the motor may operate as a variable separate load on the engine and generate electricity. In a drive mode the motor may drive the engine (e.g., at engine startup). Furthermore, in a standby mode the motor may be disengaged from the motor, or provide a small separate load to the engine. A "small separate load" is a load that is not the working load and is greater than zero but less than an ordinary load that the motor acts on the engine.

One or more embodiments provide for other alternatives. For example, engineering tolerances for natural gas engines may specify a certain engine starting temperature be reached before starting the engine. Heating or cooling the engine to the starting temperature is accomplished by pumping heated (or cooled) liquid through the engine for a period of time before starting. The heating and pumping may use the battery as an extra power source to operate the pumps of the engine's temperature conditioning system.

In an embodiment, natural gas engines may have a limited load response profile. Thus, if the working load changes quickly, the engine can stall or overrun. Such load changes can occur during transmission shifts or variable operating conditions. Thus, one or more embodiments provide for one or more control algorithms and a system controller to detect working load changes on the engine and adjust accordingly the separate load supplied by the motor to the engine.

In an embodiment, the battery may be expensive, heavy, and bulky. Thus, in one or more embodiments, one or more batteries may be shared among multiple motors connected to multiple engines. In this case, a centralized control system may track the charge available in a shared battery, and adjust electrical power flow from the multiple motors accordingly (e.g., shunting excess electricity to one or more load resistors). Furthermore, the motors may be connected to an external electrical grid, thereby providing electrical power to the grid for use by other electrical devices.

FIG. 1A shows a system using a natural gas engine, in accordance with one or more embodiments. The system shown in FIG. 1A is an example operating environment of a natural gas engine having a motor for moderating the separate load on the engine and for driving the natural gas engine during startup. However, one or more embodiments contemplate other environments in which the motor and engine system described herein may be used. Thus, the example of FIG. 1A does not necessarily limit one or more embodiments.

In the example of FIG. 1A, a trailer (100) holds a number of components, including a pump (102), a transmission (104), a natural gas engine (106), an electrical unit and motor (108), and an engine cooling system (110). The pump (102) is a pump configured to be placed in operational relationships with a wellbore (112) drilled into a subterranean area (114). The pump (102) then may be used to pump a fluid into a reservoir which then forces a product (e.g., natural gas, oil, water, etc.) out of the reservoir (116) in the subterranean area (114) through the wellbore and into a receptacle (e.g., a tank).

The pump (102) may be driven by the natural gas engine (106) via a transmission (104). The transmission (104) converts the rotational energy of the drive shaft of the engine into a type of motion used to operate the pump (102).

The natural gas engine (106) is, as the name suggests, fueled by natural gas. Note that even if the product of the reservoir (116) is natural gas, the natural gas engine (106) likely uses a refined form of natural gas taken from another source. Thus, the natural gas engine (106) is subject to the stresses and operating conditions described above.

Figure 2:
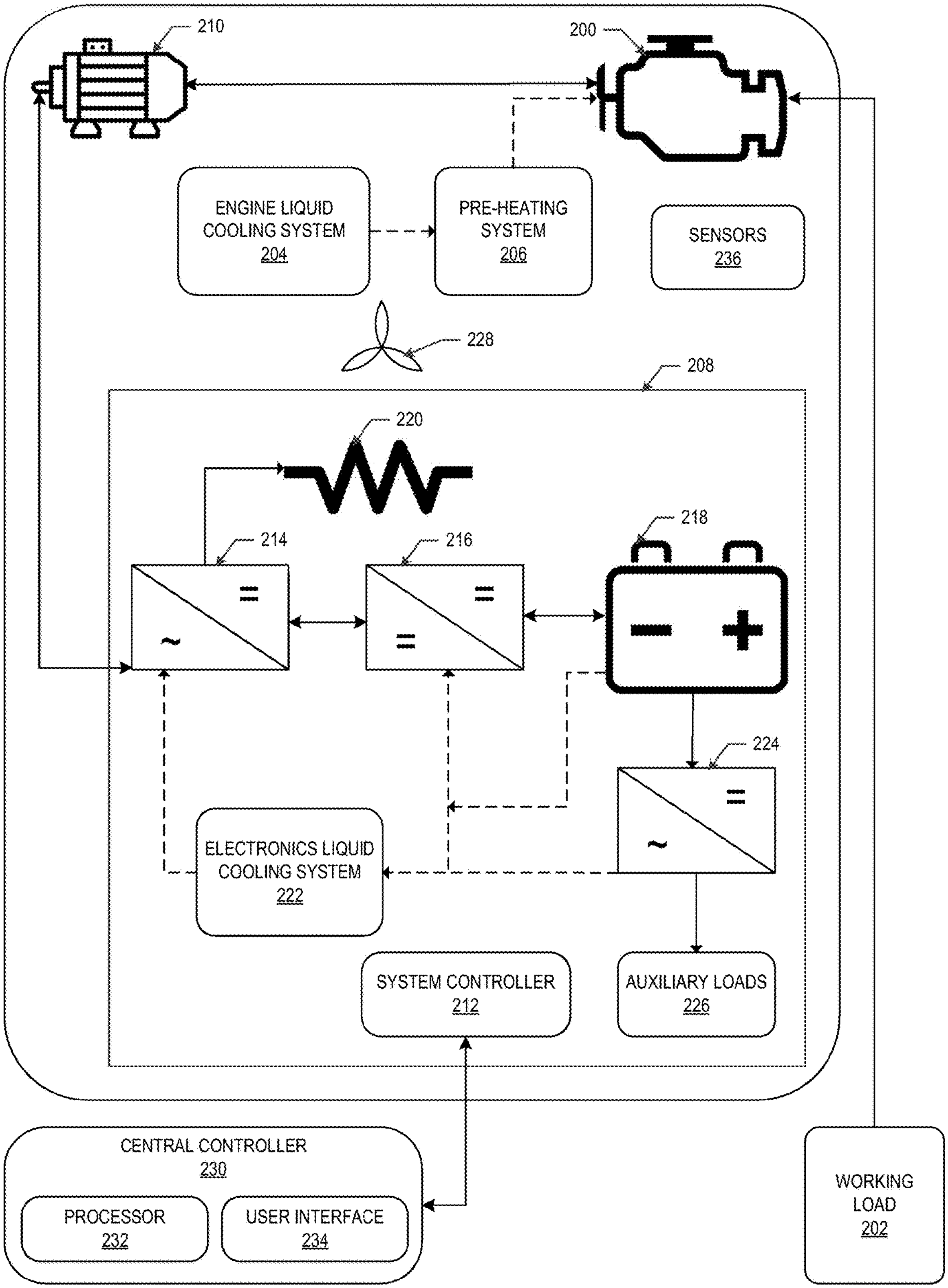
FIG. 2 shows a system architecture for a natural gas engine start and load system, in accordance with one or more embodiments.

Accordingly, the electrical unit and motor (108) are connected to the natural gas engine (106). An example of the electrical unit and motor (108) are shown in FIG. 2. Specifically, the motor in the electrical unit and motor (108) is connected to the drive shaft of the natural gas engine (106). The motor operates as described above, and further below, to moderate the load on the engine. The electrical unit and motor (108) may include other components, as described with respect to FIG. 2 to channel electrical energy generated by the motor when the motor acts as a load on the natural gas engine (106).

The trailer (100) also may hold the engine cooling system (110). The engine cooling system (110) may be a radiator, a coolant source holding a coolant, a cooling pump, or fluid transmission lines in fluid communication with the natural gas engine (106). The engine cooling system (110) may include other components. However, the engine cooling system (110) is separate from the electrical unit and motor (108) (i.e., the engine cooling system (110) is not in fluid communication with the electrical unit and motor (108)). The engine cooling system (110) and the electrical unit and motor (108) are kept separate because the operating temperature of the natural gas engine (106) may be higher than a desired operating temperature of components disposed in the electrical unit and motor (108).

In use, the trailer (100) may be hauled to a surface above the subterranean area (114). The pump (102) is operationally connected to the wellbore (112). The electrical unit and motor (108) (and specifically the motor therein) may start the natural gas engine (106) according to predetermined startup procedures. The electrical unit and motor (108) then moderates the operational load on the natural gas engine (106) as the pump (102) (i.e., the working load on the natural gas engine (106)) pumps product from the reservoir (116).

Figure 1B:
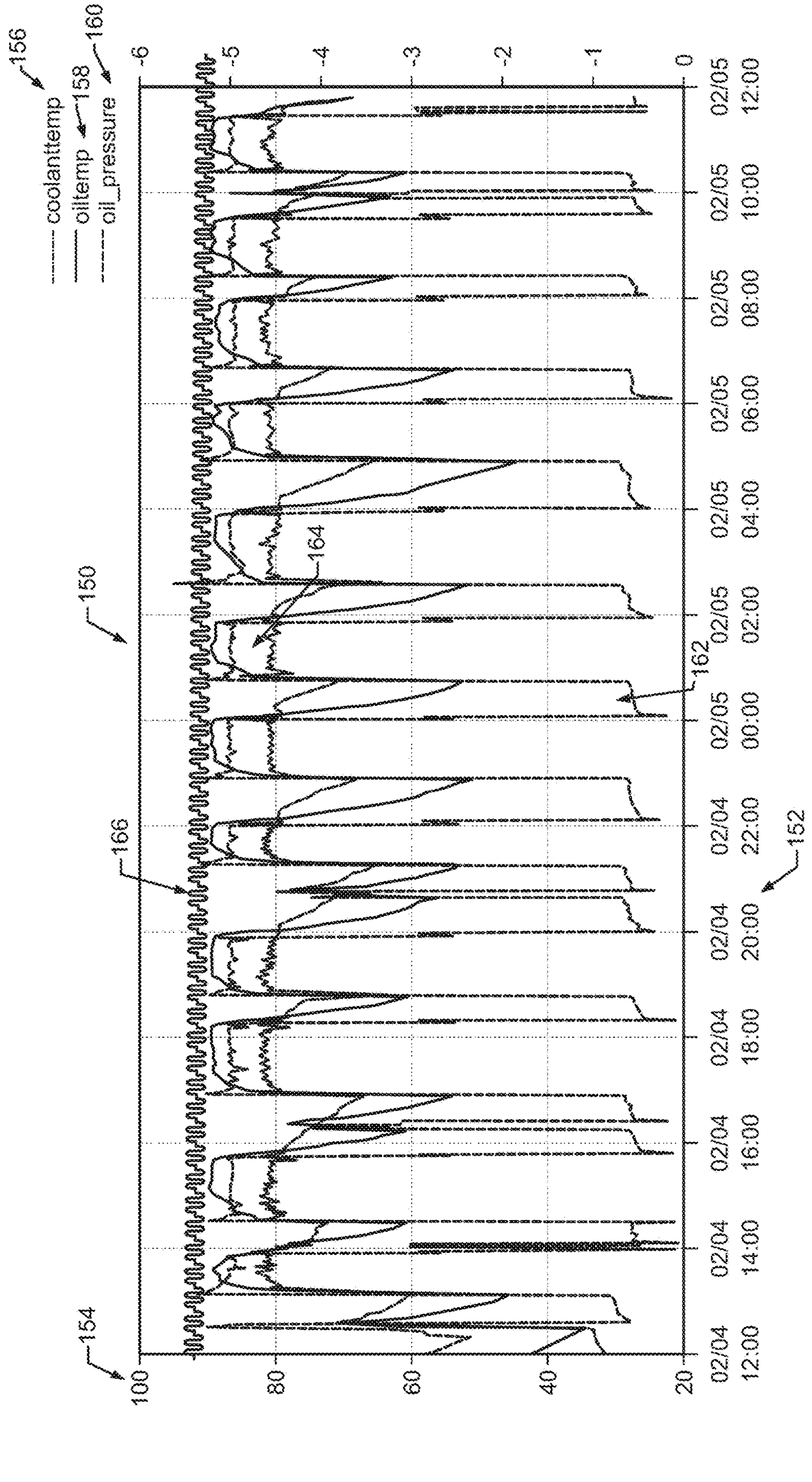
FIG. 1B shows an example of a working load cycle for the natural gas engine shown in FIG. 1A, in accordance with one or more embodiments.

FIG. 1B shows an example of a system load cycle for the natural gas engine (106) shown in FIG. 1A, in accordance with one or more embodiments. Specifically, FIG. 1B shows a graph (150) of a load cycle of a natural gas engine (106) operating the pump (102) pumping a product (natural gas, oil, water, etc.) from the reservoir (116) described in FIG. 1A. In the example of FIG. 1B, the periodic changes represent pumping for one hour, idling of the pump for 30 minutes, followed by another pumping cycle.

The times the pump is not pumping, or pumping at a lower rate, are shown as valleys (e.g., valley (162)) in the graph (150) of FIG. 1B. The times the pump is pumping, or pumping at a higher rate or at a higher oil pressure, are shown as peaks (e.g., peak (164)) in the graph (150) of FIG. 1B.

The graph (150) includes an X-axis (152) that represents time and a Y-axis (154) that represents three properties that are monitored over time. A first line (156) represents a coolant temperature of the coolant over time, a second line (158) represents an oil temperature of oil flowing through the natural gas engine (106) over time, and a third line (160) represents the oil pressure of oil within the natural gas engine (106) over time. The oil pressure, in particular, represents an indirect measurement of the load that the pump (102) applies to the natural gas engine (106) over time.

As can be seen, in FIG. 1B, periodically the working load on the natural gas engine (106) (again, as represented by the third line (160)) falls precipitously and then ramps back up precipitously. During low load times the load remains non-zero, but the total load at low load times may vary from one period to the next. Similarly, peak loads are not always the same from cycle to cycle, as the pump may need to work more or less to pump the product depending on prevailing conditions (which may include the external temperature in which the pump is operating, the changing nature of the product being pumped (e.g., the sudden appearance of sand in oil being pumped, etc.).

One or more embodiments address the undue stress that would be imposed on a natural gas engine by the load cycle shown in the graph (150) of FIG. 1B. As mentioned above, a motor is connected to the engine, and a control system commands the motor to vary the separate load on the engine. Thus, for example, when the system of FIG. 2 is used, the combined engine load over time appears more like the moderated pressure line of fourth line (166) shown in FIG. 1B.

FIG. 2 shows a system architecture for a natural gas engine start and load system, in accordance with one or more embodiments. Some components shown in the system shown in FIG. 2 may be the components shown in FIG. 1A. For example, FIG. 2 shows a natural gas engine (200), which may be the natural gas engine (106) of FIG. 1A. Similarly, the working load (202) may be the pump (102) shown in FIG. 1A. Likewise, the engine liquid cooling system (204) (which may include a pre-heating system (206)) may be the engine cooling system (110) of FIG. 1A. Additionally, the electrical unit (208) may be the electrical unit component of the electrical unit and motor (108) of FIG. 1A, and the motor (210) may be the motor component of the electrical unit and motor (108) of FIG. 1A.

The natural gas engine (200), the engine liquid cooling system (204), and the motor (210) may be as described with respect to the natural gas engine (106), the pump (102), the engine cooling system (110), and the motor component of the electrical unit and motor (108) of FIG. 1A. Again, the working load (202) may be the pump (102) of FIG. 1A. In an embodiment, the natural gas engine (200) may have a specified engineering tolerance of a 300 KW (kilowatt) continuous load, plus or minus an engineering variance, in order to maintain a definition of proper operation. As mentioned above, and described further below, the motor (210) may be used to maintain the natural gas engine (200) within the specified engineering tolerance.

In an embodiment, the natural gas engine (200) is directly connected to the motor (210) via a crank shaft that turns in response to pistons being driven within the natural gas engine (200). Thus, the motor (210) may act as a load on the natural gas engine (200). The motor (210) also may impose torque on the engine, such as to start the natural gas engine (200) at engine startup (e.g., 1290 foot-pounds (ft-lb) of torque at up to 60 revolutions per minute (RPM)) or to reinforce the torque generated by the natural gas engine (200) when the working load (202) exceeds a predetermined threshold. Also as described above, when the motor (210) acts as a separate load on the natural gas engine (200), then the motor (210) generates electricity, which is routed as described further below.

The natural gas engine (200) may be subject to various loads. As used herein, the term "operational load" refers to a high range of loads applied by the working load (202). The term "high range of loads" refers to a range loads that represent about the ordinary operating loads, or higher, that the working load (202) applies to the natural gas engine (200). For example, the "operational load" may be the ordinary operating loads (or higher) applied by the pump to the natural gas engine (200) when the pump is pumping a product from a reservoir. Referring to FIG. 1B, for example, the "operational load" may be the peaks (e.g., peak (164)) of oil pressure shown in the figure, as well as the spikes of oil pressure that may occur over the average peaks of oil pressure.

As used herein, the term "first load" represents a load that the working load (202) applies to the natural gas engine (200) outside of ordinary operations of the working load (202). For example, the "first load" occurs when a pump is not operating to pump product from a reservoir, or is pumping product at a reduced rate. In any case, the working load (202) is still applying at least some load to the natural gas engine (200). Thus, the "operational load" is greater than the "first load." Referring to FIG. 1B, for example, the "first load" may be the valleys of oil pressure shown in the figure (e.g., valley (162)), as well as spikes of oil pressure that may occur over the average valleys of oil pressure.

The motor (210) may be characterized as operating in different modes. When the motor (210) acts as a load on the natural gas engine (200) during valleys in the working load (202), the motor (210) may be said to be acting in a "generation mode" or an "electrical generation mode." The terms "generation mode" or "electrical generation mode" refer to the fact that the motor is generating electricity as the natural gas engine (200) turns the windings in the motor (210) about an iron (or other magnetic) core. In the electrical generation mode, the system controller may be programmed to transmit electricity generated by the motor to the battery until the battery no longer accepts a charge, and to transmit the electricity generated by the motor to the load resistor when the battery no longer accepts the charge.

The motor (210) also may act in a standby mode. The standby mode is a mode of operation of the motor (210) when the working load about equals the operational load of the natural gas engine (200). For example, the standby mode of the motor (210) may occur when the natural gas engine (200) is driving the pump to remove product from a reservoir (i.e., during the peaks of oil pressure shown in FIG. 1B).

The standby mode may be zero in some embodiments (e.g., the motor (210) is disengaged from the natural gas engine (200) or when the operational load applied to the natural gas engine (200) is within a predetermined range of loads. However, the standby mode may not be zero. For example, in some applications, during peaks of the applied working load (202) the motor (210) may still act as a separate load to the natural gas engine (200). The load applied to the motor during standby mode may be less than the load applied to the motor during electrical generation mode. In another example, the standby mode may be that the motor (210) drives the natural gas engine (200), such as when the natural gas engine (200) requires more torque than the natural gas engine (200) ordinarily would apply to the working load (202). In this case, the amount of torque that the motor (210) supplies to the natural gas engine (200) may be less than a startup torque.

In the cases where the motor (210) is in standby mode, but still acting as a load on the natural gas engine (200), the motor (210) may still generate electricity (as the engine is turning the windings in the motor (210)). However, the amount of electricity generated will be less than when the motor (210) is in electrical generation mode. Thus, "electrical generation mode" of the motor (210) remains distinct from "standby mode" of the motor (210), even if the motor (210) still generates some amount of electricity in "standby mode."

Thus, in "electrical generation mode," the load applied by the natural gas engine (200) to the motor (210) (or applied by the motor (210) to the natural gas engine (200)) is within a range loads during peaks of the working load (202). In contrast, in "standby mode," the load applied by the natural gas engine (200) to the motor (210) (or applied by the motor (210) to the natural gas engine (200)) is within a range of loads during valleys of the working load (202).

The motor (210) also may operate in a "drive mode." In a drive mode, the motor (210) is applying mechanical power to the engine (i.e., the natural gas engine (200) is a load on the motor (210)). The motor (210) may be in drive mode during engine startup. However, the motor (210) also may be in drive mode during peaks of the working load (202), such as when the working load (202) experiences a large spike and it is desirable for the natural gas engine (200) to apply more torque to the working load (202) than an engineering tolerance for the natural gas engine (200). The motor (210) also may be in drive mode during valleys of the working load (202), such as when unexpected working loads are present during a ramp up from a valley to a peak or when an unexpected working load occurs during a valley.

One or more embodiments may refer to a "selected mode" of the motor. The selected mode is the currently operating mode of the motor. Thus, the "selected mode" may be one of the generation mode, the standby mode, and the drive mode.

Attention is returned to FIG. 2, and specifically to the pre-heating system (206). The pre-heating system (206) may be used when the natural gas engine (200) is initially started. The pre-heating system (206) may be a heater (electrical coils, induction heater, etc.) that heats coolants in the engine liquid cooling system (204) or in one or more coolant lines that communicate coolant into the natural gas engine (200). Thus, when the natural gas engine (200) is to be started in cold temperatures (generally below 85 degrees Fahrenheit), then the pre-heating system (206) may pre-heat coolant in the engine liquid cooling system (204) to at a minimum predetermined temperature (e.g., 85 degrees Fahrenheit or above). The precise temperature of the natural gas engine (200) at engine start may depend on the particular engine being used. Thus, the precise heating and starting temperature may vary from the example of 85 degrees Fahrenheit.

Attention is now turned to the electrical unit (208). The electrical unit (208) includes several components, including a system controller (212), a variable frequency drive (214), a DC/DC converter (216) ("DC" stands for "direct current"), a battery (218), a load resistor (220), an electronics liquid cooling system (222), an inverter (224), and optionally one or more auxiliary loads (226). The components of the electrical unit (208) are described further below.

The system controller (212) is computer hardware and software executable by the computer hardware, and also includes electrical connections, switches, etc. that connect the remaining components of the electrical unit (208) to the system controller (212). The system controller (212) is programmed to control the components of the electrical unit (208) in order to control the load that the motor (210) applies to the natural gas engine (200), or to control the amount of torque that the motor (210) applies to the natural gas engine (200).

Communication from the central controller to the various devices and sensors on the trailer can be accomplished using CANBus, ethernet, RS485, wireless signals, analog signals, digital pulses, fiber optic signals, or other industrial communication protocols that operate using similar interfaces.

The system controller (212) is programmed to command the variable frequency drive (214) to change a selected mode of the motor according to an operational state of the engine. The operational state of the engine may be a state of loading (the engine is operating and loaded), a degree of loading on the engine, a deactivated state, an overrun state (in which case the natural gas engine (200) may benefit from the motor (210) being changed to a drive mode), etc.

The electrical unit (208) also may include a variable frequency drive (214) in electrical communication with the system controller (212), the motor (210), the DC/DC converter (216), and the load resistor (220). The variable frequency drive (214) is an electrical circuit that may control the flow of electricity to and from the motor (210). For example, the variable frequency drive (214) may be designed to direct a continuous electrical current of 600 A (amps) and a peak electrical current of 900 A.

Figure 3:
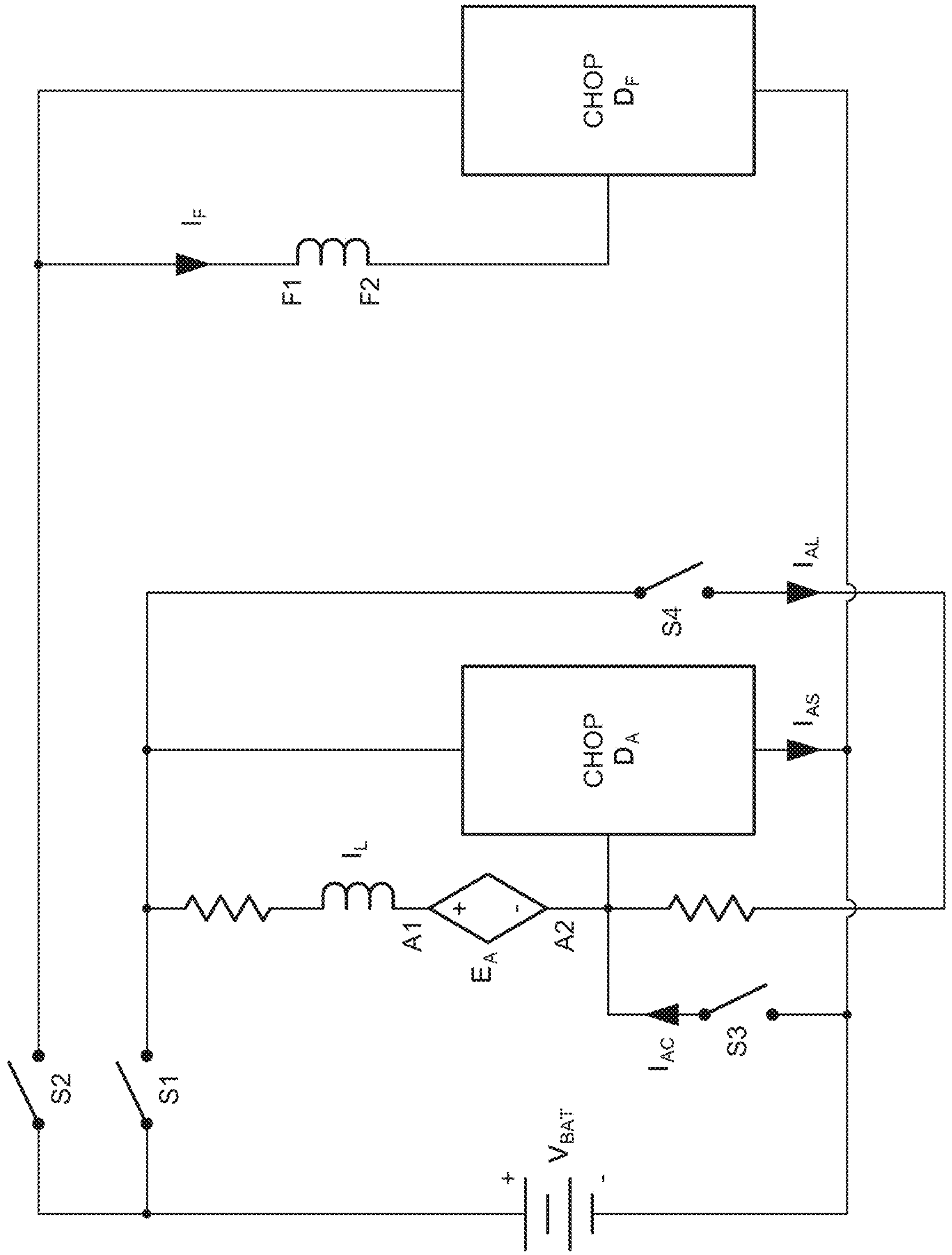
FIG. 3 shows a circuit diagram for a natural gas engine start and load system, in accordance with one or more embodiments.

In any case, the variable frequency drive (214) may route electricity generated by the motor (210) to other components of the electrical unit (208), as described below, and may provide electricity to the motor (210). The system controller (212) may control the motor (210) (such as the modes of operation described above) by directing commands in the form of electrical signals to the variable frequency drive (214). An example of the variable frequency drive (214) is shown in FIG. 3.

The electrical unit (208) also includes a DC/DC converter (216) in electrical communication with the variable frequency drive (214) and the DC/DC converter (216). The DC/DC converter (216) converts a voltage level of electricity delivered to or from the motor (210) to another voltage level delivered to or from the battery (218). Specifically, the DC/DC converter (216) converts the voltage of the electricity transmitted to the battery (218) to a range of voltages within an engineering tolerance for the battery (218), and further convers the voltage of the electricity transmitted to the motor (210) to within another range of voltages within another engineering tolerance for the motor (210).

The battery (218) is a rechargeable battery in communication with the DC/DC converter (216) and the inverter (224). The battery may be a 100 KW (kilowatt) rechargeable battery operating at a nominal voltage of 700 V (volts), though many different battery types may be used. The battery (218) may store electrical energy in the form of a charge. The charge in the battery (218) may be increased by electricity generated by the motor (210), transmitted to the variable frequency drive (214), to the DC/DC converter (216), and then to the battery (218). The charge in the battery (218) may be decreased (used) by transmitting electricity from the battery (218) to the DC/DC converter (216), to the variable frequency drive (214), and to the motor (210). The charge in the battery (218) also may be transmitted from the battery (218) to the inverter (224), and thence to one or more auxiliary loads (226).

The battery (218) may be maintained or operated using a battery management system. The battery management system may be an independent or integrated part of the battery. The battery management system may relay information regarding battery condition and performance to the system controller (212) as part of a power flow control strategy.

The battery management system may be supplemented with additional voltage, current, and temperature control sensors. The sensors may protect and enhance the battery operation to increase engine performance or protect the battery in adverse conditions.

The load resistor (220) is an electrical resistor. The load resistor (220) serves as a sink into which electricity may be transmitted when the electricity generated by the motor (210) is not transferred to the battery (218). For example, when the charge in the battery (218) is full (i.e., within a predetermined engineering tolerance of a maximum charge of the battery (218)), then the variable frequency drive (214) may transmit electricity generated by the motor (210) to the load resistor (220).

The load resistor (220) converts electrical energy of the electricity into heat energy. Thus, the load resistor (220) may become hot (e.g., several hundred degrees Fahrenheit).

Accordingly, a fan (228) may be directed to blow air or other gas over the load resistor (220) in order to cool the load resistor (220) in use. The fan (228) may include multiple fans. The fan (228) may be integrated with the load resistor (220), but may be a separate component in some embodiments. The fan (228) may be powered by the battery (218), in an embodiment.

Optionally, the electronics liquid cooling system (222) described below may be disposed to absorb heat from the load resistor (220). In another embodiment, both the fan (228) and the electronics liquid cooling system (222) provide cooling for the load resistor (220).

The electrical unit (208) also may include an electronics liquid cooling system (222). The electronics liquid cooling system (222) cools one or more components of the electrical unit (208) so that the components remain within ranges of temperatures that are within engineering tolerances for the components. The electronics liquid cooling system (222) may be a water system, or some other coolant, that includes one or more pumps and one or more coolant lines that are disposed on, near, or within one or more components of the electrical unit (208) described above. The pumps for the electronics liquid cooling system (222) may be powered by the battery (218), in an embodiment.

The electrical unit (208) also may include an inverter (224). The inverter (224) is an electrical circuit that converts a direct electrical current (DC) to an alternating current (AC). The battery (218) may supply DC electricity, but some electrical components (e.g., the auxiliary loads (226)) may be built to consume AC electricity. Thus, the inverter (224) converts the DC electricity provided to by the battery (218) to an AC current supplied to the auxiliary loads (226), to other components of the electrical unit (208), and possibly to external devices that consume electricity.

As mentioned above, the electrical unit (208) also includes one or more auxiliary loads (226) powered by the battery. The auxiliary loads (226) are electrical devices not otherwise mentioned above. The auxiliary loads (226) therefore may, or may not, be part of the electrical unit (208). For example, the auxiliary loads (226) may include one or more pumps for the electronics liquid cooling system (222), the engine liquid cooling system (204), or both. The auxiliary loads (226) may include other components, such as lights physically on the trailer and in electrical communication with the inverter (224).

The system shown in FIG. 2 also may include a central controller (230). The central controller (230) is a computing system including a processor (232), and possibly including a user interface (234). The central controller (230) may be other hardware or software, though in any case the central controller (230) is programmed to control the system controller (212). The central controller (230) may be connected to additional other system controllers of other systems similar to the system shown in FIG. 2. Thus, the central controller (230) may be used to control multiple trailers and the systems disposed thereon, such as the trailer (100) shown in FIG. 1A.

The user interface (234) may display a status of one or more components of the system of FIG. 2 (such as information gathered by the sensors (236)). The user interface (234) also may include one or more alarms set to activate when thresholds in parameters measured by one or more sensors (236) are satisfied. In the event of an alarm, a user may be notified that action should be taken with respect to one or more components of the system of FIG. 2 (e.g., to shut down the working load (202)), or an automated process may be initiated by the system controller (212). Alarm information and alarm history may be displayed and stored. The alarm information may be, for example, the time of a detected fault, a reset time, credentials of the person who issued the reset, fault troubleshooting information, etc.

The user interface (234) may have user access levels. The user access levels may be used to create individual user credentials, granting or denying them access to change operational settings, clear alarms, create new users, disable alarms, and create and delete users.

The central controller (230) and user interface (234) may be located in an enclosure, rated for the environment, and located onboard the trailer. However, the central controller (230) and user interface (234) may be located elsewhere, in which case the central controller (230) and user interface (234) may be in wired or wireless communication with the system shown in FIG. 2. Thus, the central controller (230) and user interface (234) may be controlled remotely from the end user's infrastructure. Setpoints, alarms, and functionality from the operator interface may be controlled remotely as well.

The central controller (230) and user interface (234) may be available via a remote diagnostic link provided by RDP, VPN, private VPN appliances, cloud based diagnostic services, etc. Thus, the one or more embodiments contemplate both local (on site) and remote control of the system controller (212).

The system shown in FIG. 2 may include one or more sensors (236). The sensors (236) may be a variety of different sensors used to measure various properties of the components of the system of FIG. 1 in order to generate data describing a state of the components. Thus, one or more of the sensors (236) may include a torque sensor connected to the natural gas engine (200). One or more of the sensors (236) may include a flow rate sensor connected to the pump, when the working load (202) is a pump. One or more of the sensors (236) may measure an operational revolutions per minute (RPM) of the natural gas engine (200), the motor (210), or both. One or more of the of the sensors (236) may measure time. One or more of the sensors (236) may measure electrical properties of components of the electrical unit (208) or electrical connections between the components of the electrical unit (208). One or more of the sensors (236) may include thermometers disposed to measure the temperatures of the natural gas engine (200), the motor (210), the engine liquid cooling system (204), the electrical unit (208), the electronics liquid cooling system (222), the load resistor (220), or other components of the system shown in FIG. 1. Other sensors may be available.

The sensors (236) provide data used by one or more algorithms executed by the system controller (212). The one or more algorithms may measure, for example, a ramp-up or ramp-down in the applied load that the working load (202) is applying to the natural gas engine (200), and then change a mode of operation of the motor (210) accordingly. The one or more algorithms may measure, for example, a charge of the battery (218) and command the variable frequency drive (214) to route electricity generated at the motor (210) to the battery (218), the load resistor (220), or both, accordingly. Other uses of the data generated by the sensors (236) may be envisioned.

The system of FIG. 2 also may include one or more solar panels, hydrogen fuel cells, and power interface components. Other power generation devices may be included. The alternative energy sources may be used for the purpose of maintaining a full charge on the battery system when the motor is not in operation, when the battery is partially or completely depleted, or to fully power the system. Further, one or more additional systems, such as the system shown in FIG. 2, may be provided for the purpose of warming, circulating current, engine start, and increasing power flow to more demanding tasks.

The system shown in FIG. 2 may be used in a variety of embodiments. For example, the system may be used to manage electrical and mechanical loads with respect to datacenters, microgrids, and off-road haul vehicles. Possible embodiments include reducing the size of the engine and offsetting the power with a larger motor or battery or completely removing the engine and using the motor and battery to operate the pump.

A transmission between the engine and the motor (or between the engine and the working load) could be removed. In this case, the motor may provide the torque used throughout a lower speed portion of the engine operating range. The one or more embodiments may also include a centralized battery trailer that can power many smaller trailers. Such an arrangement permits the smaller trailers to operate without individual batteries, or relying less on individual batteries (relying, entirely or partially, on the central battery).

While FIG. 1A, FIG. 1B, and FIG. 2 show a configuration of components, other configurations may be used without departing from the scope of one or more embodiments. For example, various components may be combined to create a single component. As another example, the functionality performed by a single component may be performed by two or more components.

FIG. 3 shows a circuit diagram for a natural gas engine start and load system, in accordance with one or more embodiments. The electrical circuit shown in FIG. 3 may be part of the variable frequency drive (214) shown in FIG. 2.

Specifically, FIG. 3 shows an electrical circuit (300) that forms a chopper, in accordance with one or more embodiments. As indicated above, the motor may be used to load the engine, while the pump comes up to speed, loading the engine through the variable frequency drive and the load resistor. The chopper shown in FIG. 3 loads the engine to a desired load until the working machinery to be powered has reached its production operational parameters. The chopper also may be used to control a mode of operation of the motor (210) shown in FIG. 2.

The electrical circuit (300) uses industry standard symbols for electrical components. Thus, for example, a resistor is designated by a triangle wave, such as resistor $R_L$. Similarly, an inductor is shown as a curly line, such as inductor $I_L$.

The electrical circuit (300) includes a number of switches, labeled as "S #". For example, four switches are shown, labeled $S_1$, $S_2$, $S_3$, and $S_4$.

In an engine start mode, switches $S_1$ and $S_2$ are closed. Duty $D_F$ controls the current $I_F$. The duty $D_A$ controls the current $I_{AS}$, which is proportional to an output of a speed regulator.

In a charging mode, switches $S_1$, $S_2$, and $S_3$ are closed. The engine speed will be nominal in charging mode. Duty $D_F$ controls the current $I_F$.

In loading mode, switches $S_2$ and $S_3$ are closed. Duty $D_F$ controls the current $I_F$.

Figure 4:
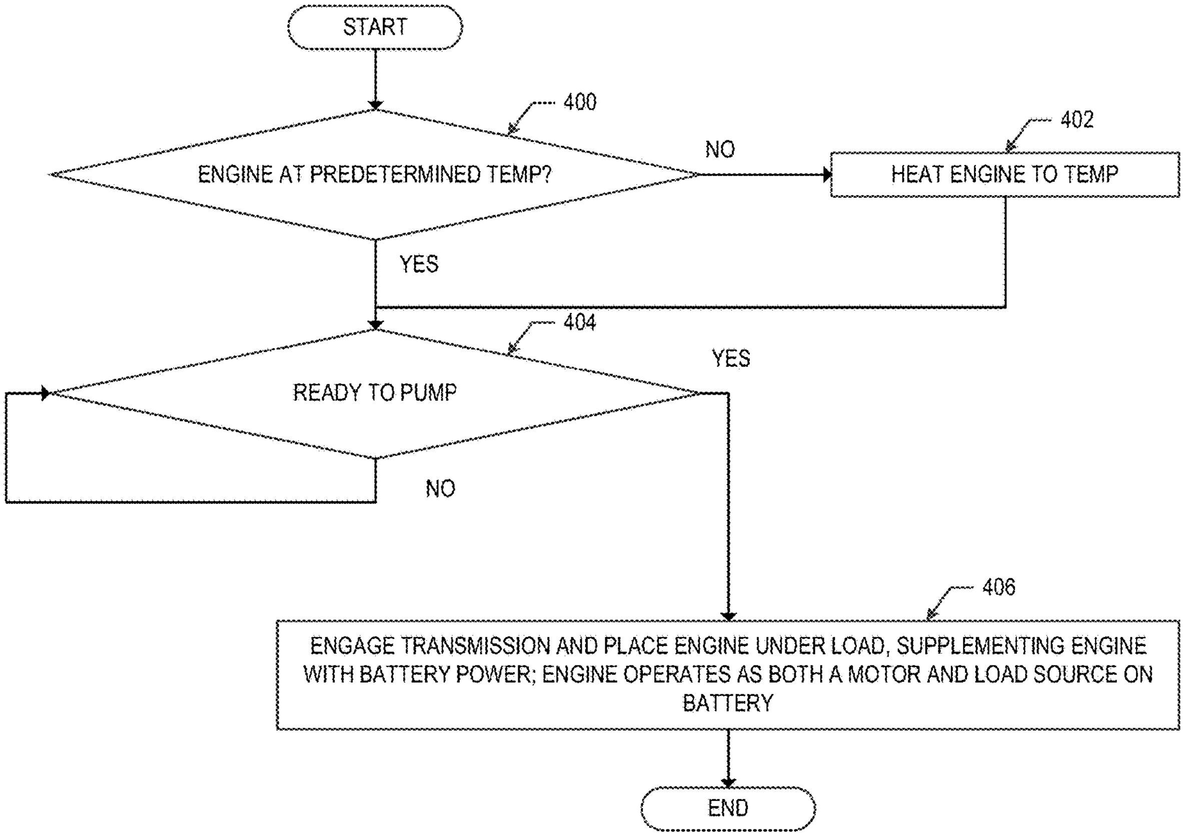
FIG. 4 shows a method of operating a natural gas engine start and load system, in accordance with one or more embodiments.

FIG. 4 shows a method of operating a natural gas engine start and load system, in accordance with one or more embodiments. The method of FIG. 4 may be performed using the system shown in FIG. 1A and the system shown in FIG. 2.

Step 400 includes determining if the engine is at a predetermined temperature. If not, then step 402 includes heating the engine to the predetermined temperature.

Once the engine is at temperature, step 404 includes determining if the natural gas system is ready to pump. If not, then the system controller waits until the natural gas system is ready to pump. If so, then step 406 includes the system controller engaging the pump system transmission and placing the engine under load. The engine is thereby started by the motor, which uses battery power to drive the engine.

One or more embodiments include unique features. The motor acts as both a motor and a generator. The motor acts as a motor to provide power to start the engine or overcome high engine load during operation. The motor also acts as a generator to load the engine to the load levels set for a natural gas engine.

In addition, the system controller includes an algorithm that takes one or more inputs from the sensors in the system (thermometers, pressure sensors, torque sensors, pump rates, etc.) and possible external devices to determine the amount of engine load, predict future engine load, and quickly react to any changes in the engine load. The load applied by the motor to the engine is then varied accordingly to urge the engine to continue to operate within engineering load tolerances.

The algorithm response may be faster than the dynamics of the system within-4 decibels of attenuation between response and disturbance. One or more algorithms also may use the inputs from the sensors and possible external devices to determine where to send power that is being generated by the motor. One or more algorithms provide a predetermined shutdown procedure of the various system components by isolating the battery and discharging the power on a DC bus. One or more algorithms also may detect the presence of an electrical grid connected to the battery and determine how to utilize the electrical grid to maximize an efficiency of the system (e.g., by providing power to, or drawing power from, the electrical grid).

An example of the unique features of one or more embodiments follows: The example relates to providing a trailer that includes a generator that is used during a fracking operation. Specifically, the trailer contains a natural gas engine coupled to a transmission that is coupled to a pump. The natural gas engine is to be warmed to 85 degrees Fahrenheit before operating, but currently is at a temperature less than 85 degrees Fahrenheit. The operator pushes a button to start the engine. The system controller is powered on and determines if the system controller can enable the main battery system by reading the battery temperature sensor.

In the example, the main battery system is above a minimum temperature, so the battery system is enabled. The system controller also closes isolation contacts that connect the battery to a DC/DC converter. The system controller then communicates to an engine control unit (ECU) and liquid cooling temperature sensors to determine if the engine can be started. The engine is below 85 F, so the system controller initiates a liquid heating system and pumps heated liquid through the cooling system of the engine.

Once the engine reaches 85 degrees Fahrenheit, the gas heating system is disabled and the system controller uses the DC/DC converter and the battery to transfer power to the variable frequency drive. The system controller uses the variable frequency drive and motor to start the engine. Once the engine is started, the system controller uses the variable frequency drive to turn the motor into a generator to slowly ramp the load on the engine to a predetermined minimum threshold load for proper engine operation.

The system controller determines the battery level of charge and a charge rate. The system controller also determines if the power the motor is producing should flow to the battery through the DC/DC converter or flow to the load resistor. The system controller then informs the operator or system controller that the engine is ready.

The operator or system controller gives a start pumping command. The command shifts the transmission into gear and starts the pump.

The system controller detects that the transmission is loading the engine and ramps the load from the motor down as the transmission and pump load ramp up. The system controller may control the total load to match the minimum threshold specified for the engine to operate properly.

As the pump operates, the system controller monitors engine load and varies the load from the motor to maintain the engine at a minimum load level. As the transmission shifts between gears, the system controller may detect the gear shifts and quickly command the motor to ramp up the load on the engine. In this manner, the minimum load threshold on the engine may be maintained as the engine is unloaded during the transmission shift. As the system controller loads and unloads the engine during operation, the system controller may also determine the battery charge level. Electricity generated by the motor is sent to the battery if the battery can accept the power generated by the motor, or is sent to the load resistor otherwise.

If the engine becomes overloaded during pumping, the system controller sends electrical power from the battery power, through the DC/DC converter, and through the variable frequency drive to the motor. The motor then provides additional power to the engine until the transmission can shift or until the overload situation ceases. Thus, the motor also may provide the additional rotational energy that prevents the engine from being overloaded by the working load of the fracking pump.

As pumping completes, the system controller slowly ramps up the load on the engine using the motor. The system controller maintains the load level on the engine as the transmission shifts to neutral and the engine cools down. The term "slowly" is a predetermined load ramp-up rate, as determined by an engineer. The system controller then ramps the load down and shuts down the engine.

After the engine is shut down, the system controller uses the load resistor to remove the power from the DC bus shared between the variable frequency drive and the DC/DC converter. The system controller finally opens electrical contacts and isolates the battery from the rest of the system. The pump can be disengaged from the wellbore, and the trailer hauled to another exploration and production site for pumping more product from other wellbores.

Figure 5:
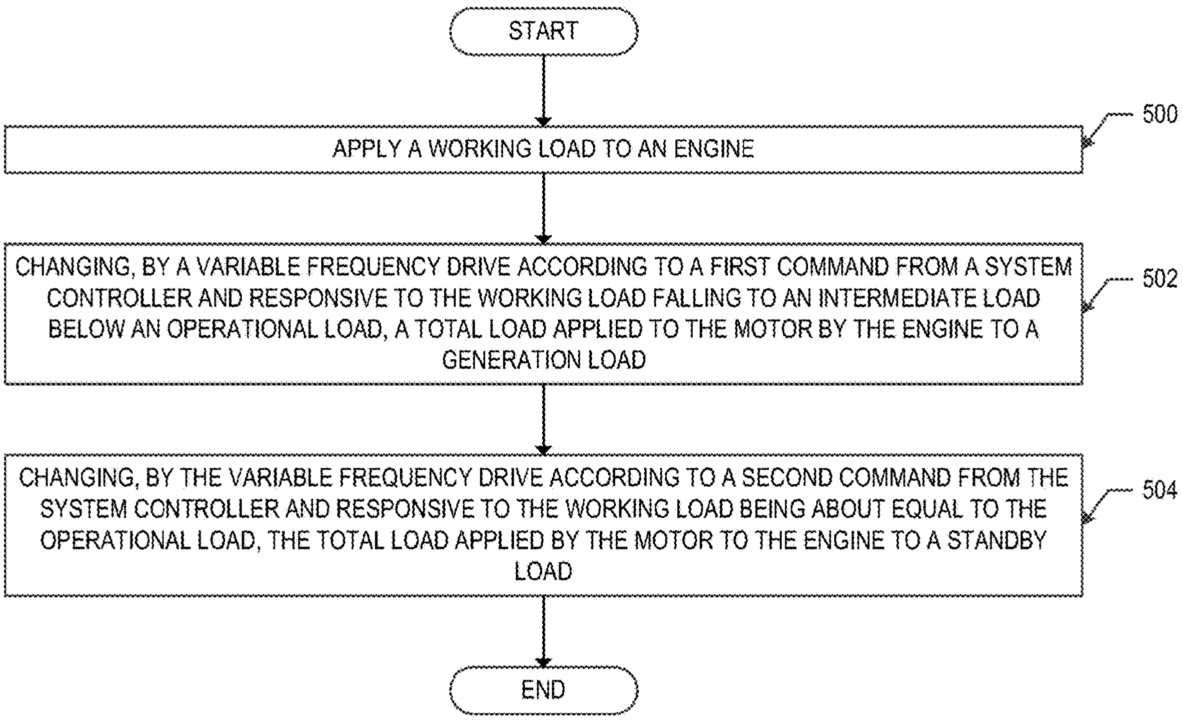
FIG. 5 shows a method for changing a total load applied by a motor to an engine, in accordance with one or more embodiments.

FIG. 5 shows a method for changing a total load applied by a motor to an engine, in accordance with one or more embodiments. The method of FIG. 5 may be performed using the system shown in FIG. 2.

Step 500 includes applying an working load to an engine. The working load may be applied by connecting a device to an engine and actuating the device. For example, applying the working load to the engine may include attaching a pump to the engine and actuating (i.e., turning on) the pump.

Step 500 contemplates that the working load varies over time between a first load and an operational load greater than the first load, and that the engine is connected to a motor. The motor is connected to a variable frequency drive. A system controller is connected to the variable frequency drive.

Step 502 includes changing, by the variable frequency drive according to a first command from the system controller and responsive to the working load falling to an intermediate load below the operational load, a total load applied to the motor by the engine to a generation load. The generation load combined with the intermediate load may be about the operational load. Operation of the variable frequency drive is described with respect to FIG. 2 and FIG. 3. The total load is changed by changing a degree of physical engagement between the motor and the engine (e.g., via a transmission). The more physically engaged the motor is with the engine, the more of a load the motor imposes on the engine.

Step 504 includes changing, by the variable frequency drive according to a second command from the system controller and responsive to the working load being about equal to the operational load, the total load applied by the motor to the engine to a standby load. Step 504 may be performed in a manner similar to step 502; however, the mode of the motor may be changed to the standby mode.

The method of FIG. 5 may be varied. For example, the method may include changing, prior to applying the working load to the engine and by the variable frequency drive according to a third command from the system controller, the motor to a drive mode. Thus, for example, the motor may be commanded to physically engage the engine and drive the engine (e.g., supply torque to the drive shaft of the engine). In this manner, the engine may be started by engaging the motor in a drive mode. In other words, the method may include starting, by the motor and responsive to the drive mode, the engine.

The method of FIG. 5 also may include transmitting, when the motor is under the generation load, electrical energy generated by the motor to a battery. In this manner, power may be provided from the battery to the variable frequency drive, the system controller, or to some other combination of components (such as the components of electrical unit (208) shown in FIG. 2).

The method of FIG. 5 also may include transmitting, when the battery stops accepting a charge, the electrical energy to a load resistor. In an embodiment, the method also may include cooling the load resistor by blowing a fan to move air over the load resistor. In an embodiment, the method also may include cooling the engine with an engine liquid cooling system in fluid communication with the engine. In an embodiment, the method also may include cooling the variable frequency drive, the battery, and the system controller with an electronics cooling system in fluid communication with the variable frequency drive, the battery, and the system controller, wherein the electronics cooling system and the engine liquid cooling system are separate.

In an embodiment, the variable frequency drive, the battery, the electronics cooling system, and the system controller are housed in an electronics unit. The working load may be a pump and the engine is connected to the pump via a transmission. In this case, the method of FIG. 5 may include placing the motor, the engine, the transmission, the pump, and the electronics unit on a trailer. The method also may include hauling the trailer to an exploration and production site. The method also may include connecting the pump in an operational relationship with a wellbore disposed in the exploration and production site. The method also may include pumping, with the pump operated by the engine, a product from the wellbore. The method also may include controlling, while pumping, the motor between the generation load and the standby load.

Still other variations are possible. Thus, while the various steps in the flowcharts of FIG. 4 and FIG. 5 are presented and described sequentially, at least some of the steps may be executed in different orders, may be combined or omitted, and some of the steps may be performed in parallel. Furthermore, the steps may be performed actively or passively.

In one embodiment, the system shown in FIG. 2 may be an 800V maximum, 700V nominal battery-based system to operate large natural gas engines in oilfield applications, throughout a set of dynamic operating conditions, without the need for external power or auxiliary generator. The system has the following capabilities: the system thermally conditions the battery; warms and circulates engine coolant until the minimum start temperature is reached; acts as a starter for the natural gas engine using the included electric motor; loads the engine to the minimum load specified by the users; act as a dynamic load during transmission shifting; and use the electrical motor and battery to assist the engine to maintain engine speed settings during short interval load transients.

The system includes algorithms for controlling the electric machine (e.g., a pump) and supporting devices to load the engine in order to assist the engine in maintaining its speed setpoint. The algorithms include physics based controllers that calculate responses in order to reject electrical disturbances and that respond to setpoint changes such that the controller input to output attenuation of less than −3 decibels will not occur. The algorithms of the system may include, but are not limited to, proportional control, acceleration control, jerk control, derivative control, integral control, feed-forward control, feed-forward of decoupled actual system values.

Load loss may arise from many occurrences, but examples of load loss may occur when a sand slurry hose bursts or a drive shaft fails, causing the engine to accelerate. The system of the one or more embodiments provides enough load on the engine to, at a minimum, slow the rate of acceleration while the engine and trailer controls shutdown the engine, allow the throttle control to respond, or protect the engine. Further, the system may accelerate the engine in response to an engine deceleration by use of the electric motor. Engine deceleration may be caused, for example, by engine fuel starvation and sand slurry pump clogging.

One or more embodiments described above do not necessarily limit other embodiments. For example, multiple trailers could be connected together to provide more power than a single trailer, provide the ability to start a trailer with a low battery, utilize a centralized battery to allow trailers to operate without a main battery, or to provide a centralized point that could allow connection to the electrical grid for battery power regeneration.

One or more embodiments also contemplate varying motor architectures. Such different architectures include, but are not limited to, DC motors, switched reluctance motors, synchronous reluctance motors, permanent magnet synchronous motors, or AC induction motors. Still other variations are possible.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For example, two angles may be "about congruent" if the values of the two angles are within a first predetermined range of angles for one embodiment, but also may be "about congruent" if the values of the two angles are within a second predetermined range of angles for another embodiment. The ordinary artisan is capable of assessing what is an acceptable engineering tolerance for a particular product, and thus is capable of assessing how to determine the variance of measurement contemplated by the term "about."

As used herein, "quickly" means within a predetermined time limit and "slowly" means within a predetermined time limit that is less than "quickly." As used herein, the terms "properly" and "safely" are defined by engineering tolerances set by an engineer.

As used herein, the term "connected to" contemplates at least two meanings, unless stated otherwise. In a first meaning, "connected to" means that component A was, at least at some point, separate from component B, but then was later joined to component B in either a fixed or a removably attached arrangement. In a second meaning, "connected to" means that component A could have been integrally formed with component B. Thus, for example, a bottom of a pan is "connected to" a wall of the pan. The term "connected to" may be interpreted as the bottom and the wall being separate components that are snapped together, welded, or are otherwise fixedly or removably attached to each other. However, the bottom and the wall may be deemed "connected" when formed contiguously together as a monocoque body.

In addition, the term "directly connected to" means that component A and component B are connected immediately adjacent to each other. For example, component A and component B may share a common point of contact in at least one area of both components. However, the common point of contact may be a connector (e.g., a bolt, a screw, etc.), in which case it is possible that component A is "directly connected to" component B without a direct contact between the surfaces of component A and component B. However, in any case, if component A and component B are "directly connected to" each other, then no intervening parts, other than possibly a connector, exist between component A and component B.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of natural gas engine start and load systems. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the word "or" is an "inclusive or" and, as such includes "and." Further, items joined by an or may include any combination of the items with any number of each item unless expressly stated otherwise.

In the above description, numerous specific details are set forth in order to provide a more thorough understanding of one or more embodiments. However, it will be apparent to one of ordinary skill in the art that one or more embodiments may be practiced without these specific details. In other instances, well-known features have not been described in detail to avoid unnecessarily complicating the description. Further, other embodiments not explicitly described above can be devised which do not depart from the scope of one or more embodiments as disclosed herein. Accordingly, the scope of one or more embodiments should be limited by the attached claims.

What is claimed is:

1. A system comprising:

an engine connectable to a working load, wherein the working load varies over a time between a first load and an operational load greater than the first load;

an electric motor connected to the engine and operable to drive, or be driven by, the engine;

a variable frequency drive connected to the electric motor; and a system controller connected to the variable frequency drive, wherein the system controller is programmed to command the variable frequency drive to change a selected mode of the electric motor according to an operational state of the engine, wherein the selected mode comprises, over the time, each of a plurality of modes during operation of the engine, and wherein the plurality of modes comprises:

an electrical generation mode comprising the electric motor operating as a generation load on the engine when the working load falls to an intermediate load below the operational load, wherein the generation load combined with the intermediate load comprises about the operational load, a standby mode comprising the electric motor operating as a standby load on the engine when the working load about equals the operational load, and a drive mode comprising the electric motor applying mechanical power to the engine, wherein the system controller causes the electric motor to maintain, over the time, about the same operational load on the engine.

2. The system of claim 1, further comprising:

a load resistor connected to the variable frequency drive; and a battery connected to the variable frequency drive, wherein, in the electrical generation mode, the system controller is programmed to transmit electricity generated by the electric motor to the battery until the battery no longer accepts a charge, and to transmit the electricity generated by the battery to the load resistor when the battery no longer accepts the charge.

3. The system of claim 2, further comprising:

a direct current to direct current (DC/DC) converter operationally connected between the variable frequency drive and the battery.

4. The system of claim 2, further comprising:

a fan directed to blow air from the load resistor.

5. The system of claim 1, further comprising:

an engine liquid cooling system connected to the engine.

6. The system of claim 1, further comprising:

a pre-heating system connected to the engine.

7. The system of claim 1, further comprising:

an electronics cooling system connected to at least the variable frequency drive.

8. The system of claim 1, further comprising:

a load resistor connected to the variable frequency drive;

a fan directed to blow air from the load resistor;

a battery connected to the variable frequency drive, wherein, in the electrical generation mode, the system controller is programmed to transmit electricity generated by the electric motor to the battery until the battery no longer accepts a charge, and to transmit the electricity generated by the battery to the load resistor when the battery no longer accepts the charge;

a direct current to direct current (DC/DC) converter operationally connected between the variable frequency drive and the battery;

an electronics cooling system connected to the variable frequency drive, the battery, and the DC/DC converter;

an engine liquid cooling system comprising a coolant line connected to the engine, wherein the electronics cooling system is disconnected from the electronics cooling system; and a pre-heating system disposed to apply heat to the coolant line.

9. The system of claim 1, further comprising:

a battery connected to the variable frequency drive, wherein, in the electrical generation mode, the system controller is programmed to transmit electricity generated by the electric motor to the battery until the battery no longer accepts a charge; and an auxiliary load connected to the battery.

10. The system of claim 9, further comprising:

an inverter connected between the battery and the auxiliary load.

11. The system of claim 9, wherein the auxiliary load comprises:

electrical power used by the variable frequency drive and the system controller.

12. The system of claim 1, further comprising a central controller connected to the system controller, wherein the central controller comprises:

a processor programmed to control the system controller; and a user interface, in communication with the processor, and configured to display a status of a component of the system.

13. The system of claim 12, wherein the central controller is programmed to:

predict the operational state of the engine to generate a prediction; and control the generation load according to the prediction.

14. The system of claim 1, wherein the engine comprises a natural gas engine fueled by natural gas.

15. The system of claim 1, further comprising a trailer, wherein:

the variable frequency drive and the system controller are housed in an electrical unit connected to the electric motor, and the engine, the electric motor, and the electrical unit are disposed on the trailer.

16. A method comprising:

applying a working load to an engine, wherein:

the working load varies over a time between a first load and an operational load greater than the first load, the engine is connected to an electric motor, wherein the electric motor is operable to drive, or be driven by, the engine, the electric motor is connected to a variable frequency drive, and a system controller is connected to the variable frequency drive;

changing, by the variable frequency drive according to a first command from the system controller and responsive to the working load falling to an intermediate load below the operational load, the electric motor to an electrical generation mode that applies a generation load to the engine, wherein the generation load combined with the intermediate load comprises about the operational load;

changing, by the variable frequency drive according to a second command from the system controller and responsive to the working load being about equal to the operational load, the electric motor to a standby mode that applies a standby load on the engine; and changing, by the variable frequency drive according to a third command from the system controller, the electric motor to a drive mode that applies mechanical power to the engine, wherein, over the time, the electric motor operates at least once in each of the generation load, the standby mode, and the drive mode, and wherein the system controller causes the electric motor to maintain, over the time, about the same operational load on the engine.

17. The method of claim 16, further comprising:

starting, by the electric motor and responsive to the drive mode, the engine.

18. The method of claim 16, further comprising:

transmitting, when the electric motor is under the generation load, electrical energy generated by the electric motor to a battery; and providing, from the battery, power to the variable frequency drive and the system controller.

19. The method of claim 18, further comprising:

transmitting, when the battery stops accepting a charge, the electrical energy to a load resistor;

cooling the load resistor by blowing a fan to move air over the load resistor;

cooling the engine with an engine liquid cooling system in fluid communication with the engine; and cooling the variable frequency drive, the battery, and the system controller with an electronics cooling system in fluid communication with the variable frequency drive, the battery, and the system controller, wherein the electronics cooling system and the engine liquid cooling system are separate.

20. The method of claim 19, wherein the variable frequency drive, the battery, the electronics cooling system, and the system controller are housed in an electronics unit, wherein the working load comprises a pump, wherein the engine is connected to the pump via a transmission, and wherein the method further comprises:

placing the electric motor, the engine, the transmission, the pump, and the electronics unit on a trailer;

hauling the trailer to an exploration and production site;

connecting the pump in an operational relationship with a wellbore disposed in the exploration and production site;

pumping, with the pump operated by the engine, a product from the wellbore; and controlling, while pumping, the electric motor between the generation load and the standby load.

* * * * *